Nov. 9, 1943.  S. B. WILSON  2,333,838
LUBRICANT GAUGE DEVICE
Filed Dec. 2, 1940
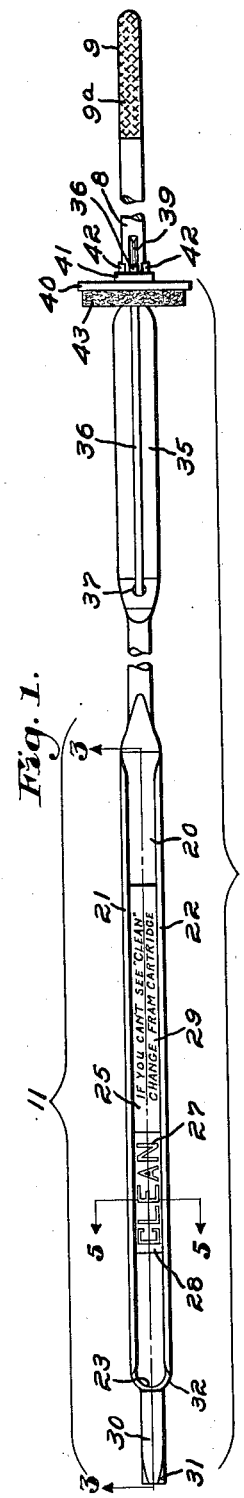
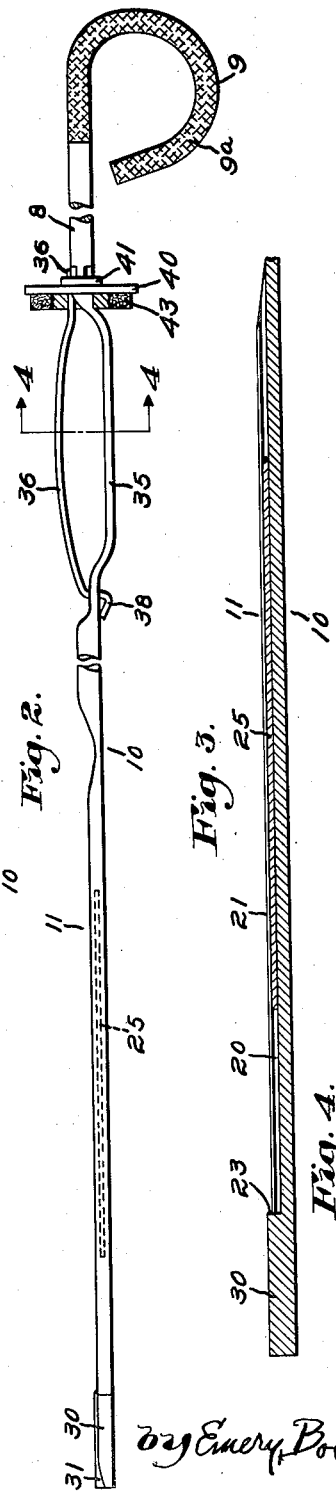
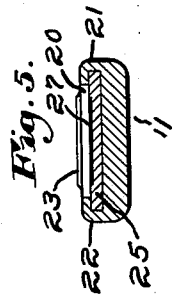
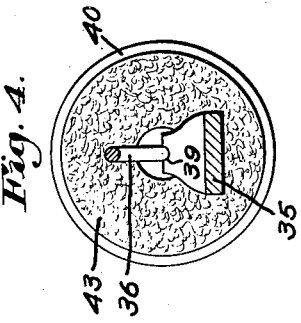
Inventor:
Steven B. Wilson,
by Emery, Booth, Townsend, Miller & Weidner
Attys.

Patented Nov. 9, 1943

2,333,838

UNITED STATES PATENT OFFICE 2,333,838

LUBRICANT GAUGE DEVICE

Steven B. Wilson, Newton, Mass., assignor to Fram Corporation, East Providence, R. I., a corporation of Rhode Island Application December 2, 1940, Serial No. 368,245

2 Claims. (Cl. 33—126.7)

My present invention relates to means for inspecting and measuring lubricating oil, as used for example in automotive and other internal combustion engines and other organizations employing fluid lubricant, to determine not only the quantity of the oil supply but especially its condition as to clarity, as a gauge of the cleanness of the lubricant and its fitness for continued use. More particularly the invention aims to provide a simple, inexpensive and otherwise improved construction for a gauge device of the inserted rod or so-called dipstick type, such as those of my Patent No. 2,176,618, dated October 17, 1939, and of my herewith copending application Ser. No. 259,855, filed March 4, 1939, now Patent No. 2,224,123, dated December 3, 1940. As to all common subject matter the present application is in such part a continuation of said copending application.

In the accompanying illustrative drawing:

Fig. 1 is an elevation of a gauge or stick embodying by way of example one structural form of the invention, viewing the front or oil clarity inspection face of the device;

Fig. 2 is a side elevation of the stick of Fig. 1, with a small portion of its handle element broken away;

Fig. 3 is a partial longitudinal section of the lower or inserting end of the stick, as upon the line 3—3 of Fig. 1;

Fig. 4 is an enlarged cross section as on the line 4—4 of Fig. 2, looking toward the handle or supporting end;

Fig. 5 is a cross section of the inserting portion of the stick as upon the line 5—5 of Fig. 1, on a similar scale as in Fig. 4 and looking toward the lower or inserting end of the device; and Fig. 6 is an elevational view of the lower portion of the stick, that at the left in Fig. 1, but looking at its rear or quantity-gauging face, opposite to that of Fig. 1.

As fully explained in my earlier copending cases above identified, it is desirable in connection with fluid lubricated organizations as above referred to that a reliable and convenient means be available for determining by inspection the clarity condition, as an index of harmful contamination, of the fluid oil content of the lubricating systems of such organizations. This is particularly important in oil systems having a filter for the oil in which the filtering means should periodically be given attention, as by changing a filter cartridge or other part, or the filter as a whole, promptly when the oil reaches a predetermined degree of darkening contamination, generally short of blackness or opacity. Such means is also desirable for non-filtering systems, to indicate for a change of the oil.

Lubricating systems such as referred to commonly are equipped with oil quantity gauges, automotive engines, for example, having a rod or dipstick removably inserted into the oil chamber of the crankcase through an aperture provided for the purpose. While my oil quality gauge or inspector may be constituted as a separate device, preferably and in the illustrated examples it is combined with the quantity gauge or dipstick, desirably in such manner that the quality determining means is looked at as a matter of ordinary routine whenever a reading of the quantity indication is taken.

Referring to the drawing in further detail, the oil inspector stick in this instance is fashioned in the entirety of its main portions as a one-piece device, formed from a single unitary length of a metal or other stock or material, generally in rod, wire or blade form, and of a character initially adapting it to be stamped or otherwise worked into a formation such as here represented by way of example, a suitable material for the purpose being an inexpensive, relatively soft grade of steel or other metal or alloy.

The oil inspector device as here illustrated comprises a supporting and manipulating portion or handle 8 the outer end of which is bent to form a grip 9. The handle is of any convenient length as appropriate to the particular circumstances of use, it being understood that in Figs. 1 and 2 an intermediate section is broken away to conserve space. The stick further comprises a body or inserting portion indicated as a whole by the numeral 10, the lower or inspecting portion 11 of which is adapted to be immersed in the oil.

The oil immersible portion of the stick is stamped or otherwise formed to provide an elongated shallow open trough or flat pocket-like oil-inspecting chamber 20, seen in section in Fig. 5, having upset side walls 21, 22 and a lower end wall 23. Such upsetting formation is facilitated by the relatively soft character of the steel, alloy or other material. This oil pocket or inspection chamber 20 may be otherwise formed as by milling out a length of the stock material to afford the low retaining walls such as illustrated. The walls of the chamber 20 in the completed device desirably have a height calculated, by test or otherwise, with reference to the light-reflective property of the oil inspecting or clarity indicating area to be described, to retain such minimum depth of oil as will afford an obscuring effect on that area with oil of a predetermined impaired clarity, but to confine the maximum oil depth to that at which operatively clean oil does not illegibly cloud or obscure the inspecting area. The described upset portions or lateral walls 21, 22 of the oil inspecting chamber further serve the function of spacing the chamber floor from the wall or walls of the aperture, such as in a crank case, in which the stick is to be inserted.

The distinctive indicating area or surface means on the floor of the chamber for affording the visual indication as to the oil clarity may be variously provided, as disclosed for example in my Patent No. 2,176,618. I have here shown for the purpose an indicator strip or plate 25, which may be like that of my said copending application, of metal or other material, for example a terne plate having a surface suitable for lithographing, printing or like visually modifying formation. This strip may and desirably does include a quantity index or marking such as a line and the legend "full." A similar quantity index may be provided on the reverse face of the immersible stick portion 11, either additionally or alternatively, as herein represented by way of example in Fig. 6 at 26.

The surface means for visually indicating the oil clarity degree may include lettered indicia 27, such as "Clean," the light-reflectivity of such indicia and the associated background or surface 28 having any selected color, shade, tone, mirror-finish or other characteristic for visually distinguishing or contrasting with the clouding matter in the oil. Said surface means including any indicia or other light-reflecting areas, together with any suitable legend or instruction such as here indicated at 29 for informing as to the change to be made in response to the clarity indication, may be provided by the lithographing process, or by other method of printing or applying surface modification of a character serviceable under the temperatures and other operating conditions ordinarily found in the crank cases of internal combustion engines.

Below or beyond the oil chamber 20, toward the inserting end of the stick, the latter has an integral extension or foot 30 adapted to limit the approach of the lower end of the chamber 20 to the bottom of the crankcase or other oil-containing space. The spacing of the lower end wall 23 of said chamber from the end of the foot or stop 30 is made sufficient to insure that the oil to be inspected shall be taken from the active, circulating body of oil, without collecting from any accumulation of tarry or sludge-like substance sometimes precipitated on and adhering to the floor of a crankcase or similar oil housing. As shown in Figs. 1 and 2 the tip of the foot 30 may be bevelled as at 31 to facilitate entrance of the stick at the inserting aperture. For similar reasons the lower end wall portion of the chamber 20, which latter is wider than the foot 30, has a bevelled or rounded form in the region of its juncture with said foot, as seen at 32 in Fig. 1.

Referring to Figs. 1 and 2, the body or insert portion 10 of the stick continues integrally beyond the oil-inspecting part proper 11 for a distance appropriate for the particular engine or apparatus with which it is to be used.

At the upper or outer part of said inserting portion 10, where in the inserted position of the stick it is surrounded by the wall or walls of the inserting aperture of the crankcase or the like, the main element is formed with a lateral offset 35, as by stamping and bending the initial piece of stock to the widened and somewhat flattened shape as shown in Figs. 1 and 2 by way of example.

Laterally opposite the offset 35 and cooperable with it as a friction latch means is a relatively short longitudinally extending spring member 36, which may be a resilient steel or other metal wire. The lower end of this spring latch member 36 is inserted through an anchoring aperture 37 in the stick and is turned or hooked as at 38 to hold it in position. The other end of this spring latch 36 is slidably received in a longitudinal recess 39 in the adjacent portion of the stick handle 8.

Said upper movable end of the friction latch member 36 is held against displacement laterally of the stick by the combined stop and cap 40 having a central hub or boss 41. The cap and its hub have a central through aperture of a diameter permitting the cap to be slipped onto and along the handle end of the stick into its position adjacent the outer end of the offset 35, as seen in Figs. 1, 2 and 4, where it surrounds and confines the outer movable end of the spring latch 36 to its recess 39 in the stick handle portion.

This cap element 40 is held longitudinally as by the retaining ears 42 stamped from the material of the stick handle, above the cap. At its inner or lower face the cap is positioned by abutting engagement with the adjacent widened portion of the offset 35. Preferably a centrally apertured felt, leather or other washer or gasket 43 is provided at the lower face of the cap. This cap device 40 to 43 limits the extent of the insertion of the gauge stick into the aperture in the crankcase or other oil container, thus positioning it longitudinally and also covering said aperture. In the present example said means further serves, as above pointed out, as a retainer for the upper movable end of the spring 36 in a manner permitting longitudinal movement of the latter when the spring is compressed by the wall or walls of the stick-receiving aperture, it being understood that the offset 35 and associated spring 36 are adapted to engage said wall or walls in the manner of a friction latch to hold the dipstick in installed position, subject to withdrawal for inspection purposes.

The indicator strip or plate 25 already described is in the present embodiment held in place flatwise on the bottom of the oil recess or chamber 20 by the insetting of the lateral walls 21, 22 over the offset longitudinal edges of the strip. The strip may be otherwise secured, as by spot welding. The illustrated construction, however, permits of replacement and renewal of the indicator plate or the substitution of a different similar device appropriate to some changed condition at the point of use. To assist in visually locating this dipstick or gauge device and as an aid to identifying it as an oil quality comparative or inspecting means, a portion of the handle, such as the outer and herein curved grip part 9, may be distinctively colored, as indicated by the lining at 9a, the color orange being selected by way of example. As a further reminder of the oil quality indicating function of this dipstick the color applied as at 9a may be the same as that for the quality indicia 27 or its background 28.

It will be evident from the foregoing that the gauge stick as here disclosed embodies advantages of that of my copending application Ser. No. 259,855 together with the various features of improvement, including general simplicity of construction and ease and cheapness of manufacture, resulting from the described integral or one-piece formation for the main portions of the inspector stick proper.

My invention is not limited to the exemplary embodiment as herein illustrated or described, its scope being pointed out in my claims as follows:

1. An oil dipstick comprising an integral one-piece elongated stick formed of a wire-like metal stock and having structurally continuous handle and inserting portions, the latter including an oil-retaining lower or trough part to be immersed in the oil, said integral stick formed with a lateral offset adjacently below its handle portion, a separately formed longitudinal spring member opposite and laterally spaced from the offset between its ends, the lower end of said spring member having a hook-like seating formation, a receiving aperture for the latter at the inner end of the offset portion of the stick thereby detachably to anchor said lower end of the spring member on the stick, a longitudinal recess in the stick adjacent the upper end of the spring member and slidably receiving the latter for lengthwise movement thereof under compression of the spring member toward the offset, and a cap and positioning device surrounding and fixed on the stick at the upper end of the spring member and releasably confining it to said recess.

2. An oil dipstick comprising an integral one-piece elongated stick element formed of a wire-like metal stock and having structurally continuous handle and inserting portions, the latter including an oil-retaining lower or inspecting part to be immersed in the oil and to withdraw a quantity thereof for inspection, an integral offset between the inserting and the handle portions of the stick element, a longitudinally bowed spring disposed laterally opposite said offset, said spring attached at its lower end to the stick element, a longitudinal recess on the stick element slidably receiving the upper end of the spring, a centrally apertured disk-like cap concentrically mounted on the recessed portion of the stick element so as to enclose and confine the upper spring end to said recess, and a downwardly projecting abutment foot on the lower end of the inserting portion of the stick element and projecting below its oil-retaining part to a substantial predetermined extent adequate positively to limit insertion of said part to a level spaced above the bottom of an oil-containing chamber sufficiently to be clear of usual accumulations of non-circulating contaminant matter precipitated thereon, said foot and the inserting portion of the stick element being cooperatively dimensioned lengthwise relatively to said disk-like cap for seating of the latter at the dipstick-inserting entrance to such oil-containing chamber.

STEVEN B. WILSON.